United States Patent [19]
Klochemann et al.

[11] 3,819,305
[45] June 25, 1974

[54] LIQUID PRODUCT CONTROL SYSTEM

[75] Inventors: Karl Heinz Klochemann, Steinkamp; Frank Wurzbacher, Kolberger, both of Germany

[73] Assignee: The British Petroleum Company Limited, London, England

[22] Filed: Aug. 24, 1972

[21] Appl. No.: 283,373

[30] Foreign Application Priority Data
Aug. 27, 1971 Germany............................ 2142956

[52] U.S. Cl................................. 417/413, 417/505
[51] Int. Cl............................................. F04b 43/00
[58] Field of Search............................ 417/413, 505

[56] References Cited
UNITED STATES PATENTS
2,785,638  3/1957  Moller................................ 417/505
2,790,580  4/1957  Kresberg............................. 417/413
3,610,782  10/1971  McGuire............................. 417/413

Primary Examiner—C. J. Husar
Attorney, Agent, or Firm—Morgan, Finnegan, Durham & Pine

[57] ABSTRACT

A liquid product control system uses a pulse generator to drive a meter. Variation in flow rate is achieved by suppressing blocks of pulses. Operating pulses continue at the same frequency as they are generated and alternate with periods when all pulses are suppressed. An indicator is activated by a separate train of pulses generated by the meters.

3 Claims, 3 Drawing Figures

LIQUID PRODUCT CONTROL SYSTEM

This invention relates to apparatus and a method for controlling the flow of fluids through a system.

Control systems incorporating diaphragm pumps are known. These suffer from the disadvantage that measuring errors are not proportional to the quantity of fluid flowing through the system. Because of inertia losses, the errors are disproportionately large at low throughput.

It is an object of the present invention to provide equipment in which the measuring error is proportional to the throughput.

We have now discovered that this can be done by equipment in which a meter is driven at constant frequency and its drive is periodically switched on and off.

Thus according to the present invention there is provided apparatus for controlling the flow of fluid comprising a meter and a controller for the meter, the controller comprising a pulse generator for supplying actuating pulses to the meter at a constant frequency and a pulse suppressor for suppressing blocks of pulses.

Preferably the meter is a diaphragm pump in which the diaphragm is capable of operating at a constant amplitude.

The diaphragm may be actuated by an electromagnet actuated by the pulses of the generator.

The fluid inlet to and/or outlet from the meter is conveniently valve controlled, the valve or valves being controlled synchronously with the diaphragm.

Alternatively, in the case of positive control of the inlet and outlet valves, or of at least one of the valves it is possible to dispense with direct drive of the diaphragm. In such a case the fluid to be controlled should enter at a high pressure so that the diaphragm is always deflected by the same amount in each working cycle.

In principle it is immaterial whether only one working chamber is used on one side of the diaphragm which is acted upon by a spring on the other side, or whether working chambers are provided operating alternately on both sides of the diaphragm, which are acted upon at the positively controlled drive frequency.

The working frequency can be controlled mechanically, or, preferably, electronically. The same applies to the frequency and length of the switch off periods.

Metering can be carried out by counting the working strokes.

In the case of known volumetric meters with variable throughput, the frequency is proportional to the throughput. However, the meter according to the invention operates with a working frequency which is always constant. Below the maximum throughput it is switched off more or less often and/or for short or long periods. The frequency of the periods of switching off and the ratio of their duration to that of the working periods is determined by the throughput. The error of measurement is constant because the working frequency is always the same, and it is therefore independent of the volume stream.

Preferably the working periods, whcih all comprise an equal number of working cycles, are followed by an interruption of variable length, which has the advantage that the same error of measurement always occurs for the same number of working cycles, this being independent of whether the measurement characteristic of the first and of the following working cycles of a working period is the same. When this is done the number of working cycles included in a working period is of no importance. In the extreme case it is equal to one. In that case each working cycle is followed by a switch-off period. In this case the control devices are advantageously designed in such a way that they produce a sequence of control impulses arising at a fixed frequency which control the working cycles in such a way that successive impulses release successive operations of a working cycle. After the termination of one working period a greater or smaller number of impulses is suppressed. Instead of this it is also possible for the control devices to transmit a sequence of control signals which is proportional in its frequency to the desired throughput, each of which releases a working period or a working cycle of constant length and constant working frequency. Thus whilst it is normally more advantageous is the case of the same duration of the working periods to vary the duration of the interruptions, there also exists the possibility of varying the duration of the working periods whilst the duration of the interruption is constant or can also be varied in a corresponding manner. In this case, in order to avoid disturbing impacts and vibrations the duration of each switched-on and switched-off period is as small as possible in comparison with the normal working duration. The drive frequency, on the other hand, should be large in comparison with the switch-on and off frequency, so that any deviations of the measuring characteristic in the first operating cycles of each operating period will have as little as possible effect. For the same reason, the drive frequency should also be considerably below the critical frequency, that is to say to such an extent that the oscillation condition to be adjusted in the constant operation should differ as little as possible from the conditions in the first operating cycles of each operating period.

The invention is illustrated with reference to the accompanying drawings, wherein FIG. 1 is a longitudinal section through a measuring appliance suitable for the purposes of the invention.

Figure 1:
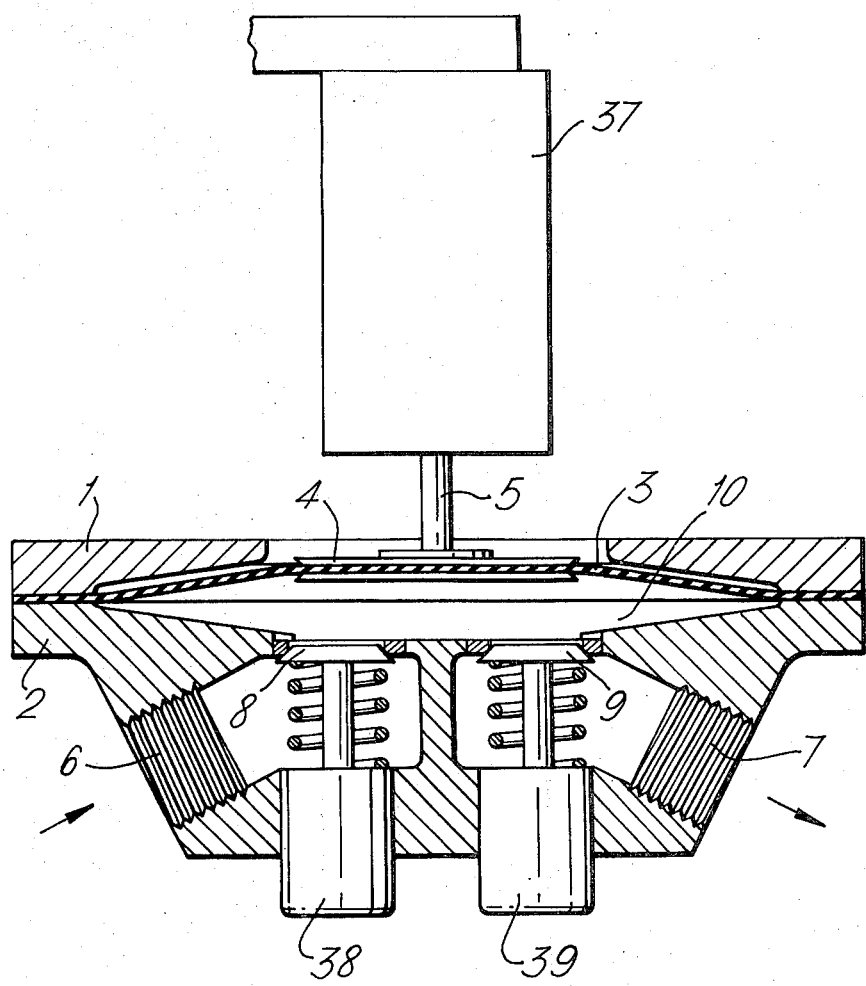

FIG. 1 shows a volumetric measuring appliance having a diaphragm pump with an upper housing 1, a lower housing 2, a diaphragm 3 clamped between them, which is connected in the centre with a plate 4 which is firmly connected with an operating rod 5. In the bottom housing there are shown an inlet channel 6 and an outlet channel 7 which are connected with feed or discharge pipes which are not shown in the drawing and each has a control valve 8 and 9, for connection with the working chamber 10 located underneath the diaphragm 3.

Magnets 37, 38, 39 are double-acting and operate against a spring to operate the diaphragm and the valves 8 and 9 respectively. They have the advantage of being easy to control electronically.

Figure 2:
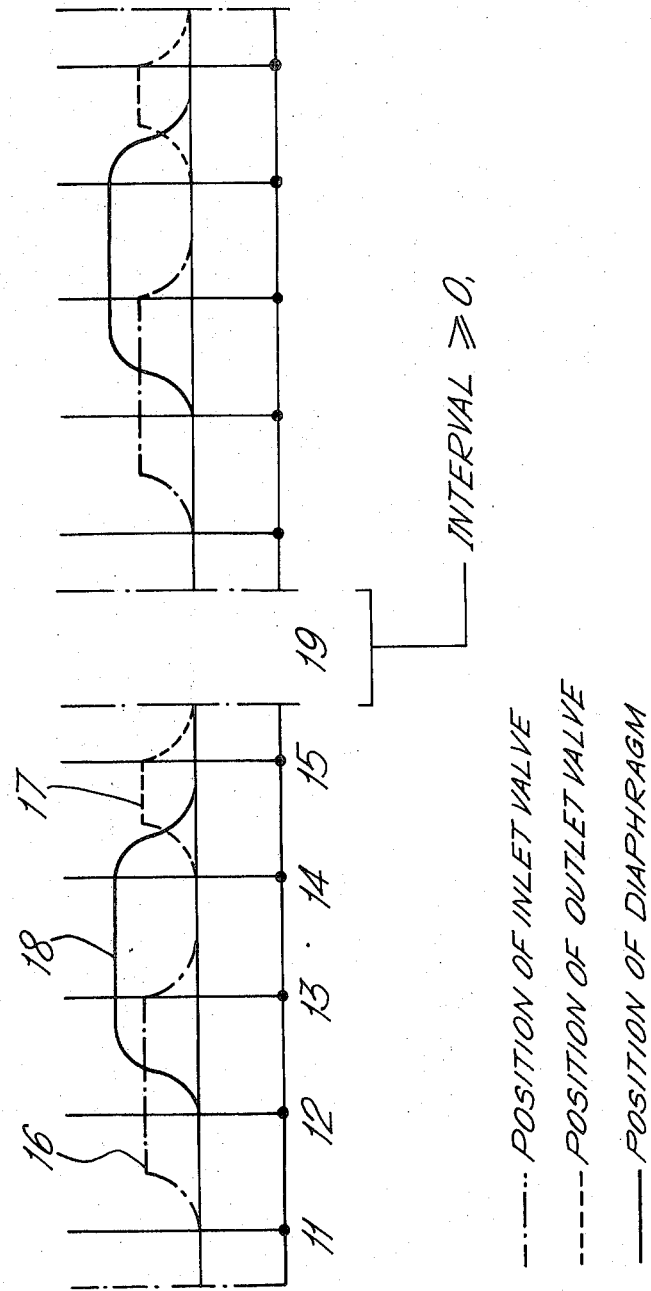
FIG. 2 is a graph illustrating the working sequence.

The graph of FIG. 2 illustrates a process for the control of a pump according to FIG. 1, and in this case it is a process in which the same number of working cycles follows an interruption of variable duration, in this example the number of the successive working cycles being one. The completion of the working cycle is determined by a number of impulses entering at the same interval from one another, which is each case release successive operations of the working cycle. These impulses are marked at 11 to 15 on the time axis. The curves plotted above them represent at 16 the path of the inlet valve, at 17 the path of the outlet valve and at 18 the path of the diaphragm. At the commencement of the working cycle, the impulse 11 brings about the opening of the inlet valve. The second impulse 12 brings about the suction movement of the diaphragm, that is to say it moves from its lower position of rest into its upper position of rest (FIG. 1). The impulse 13 causes the closing of the inlet valve, and the out thrust movement of the diaphragm. When the impulse 15 occurs, the outlet valve is closed. This ends the working cycle. Until the next working cycle there occurs an interruption 19, the length of which can be varied according to the desired throughput quantity. If an impulse generator running at a constant speed is provided for the production of the impulses, the interval is produced in that a given number of these impulses is omitted. In this way, it is true, the adjustment of the quantity of throughput can only be carried out in stages, but the size of these stages can be made as small as is desired if the impulses marked 11 to 15 are not directly successive impulses but are chosen from a sequence of impulses arriving considerably more rapidly. Thus, for example, the impulses 11 to 15 are in each case the 10th, 20th, 30th etc. impulses of a sequence of impulses which is ten times faster than is shown in the graph of FIG. 2. If now the device for determining the interval 19 is adjusted in such a way that any desired number of these rapid impulses can be omitted, a very fine regulation is possible.

It is obvious that this principle is also possible with a larger number of working cycles per working period, an adjustable interval being located between each two working periods. Furthermore it should be obvious that a corresponding regulation is also possible by instead of the work-free interval or in addition to this having the length of the working period, that is to say the number of directly successive working cycles, adjustable.

The frequencies are advantageously chosen so high that the non-continuity of the supply does not have any adverse effects within the framework of the conditions which apply. If necessary known devices can be provided for regularising the supply stream and for avoiding unpleasant surging.

In the example of the measurement of fuel in petrol pumps, in which the quantity supplied must be adjustable between about 2 and 60 litres per minute, it is possible to choose measuring appliances with a chamber volume of a few cubic centimetres, for example of 2 to 50 cubic centimetres. A preferred order of magnitude is between about 10 and 30, especially 20 cubic centimetres. It is also possible to connect several chambers parallel with one another. By switching on or off individual chambers one then has a further possibility of regulation. The impulse frequency is derived from the size of the chamber and the number of chambers connected in parallel as well as the required throughput quantity.

Figure 3:
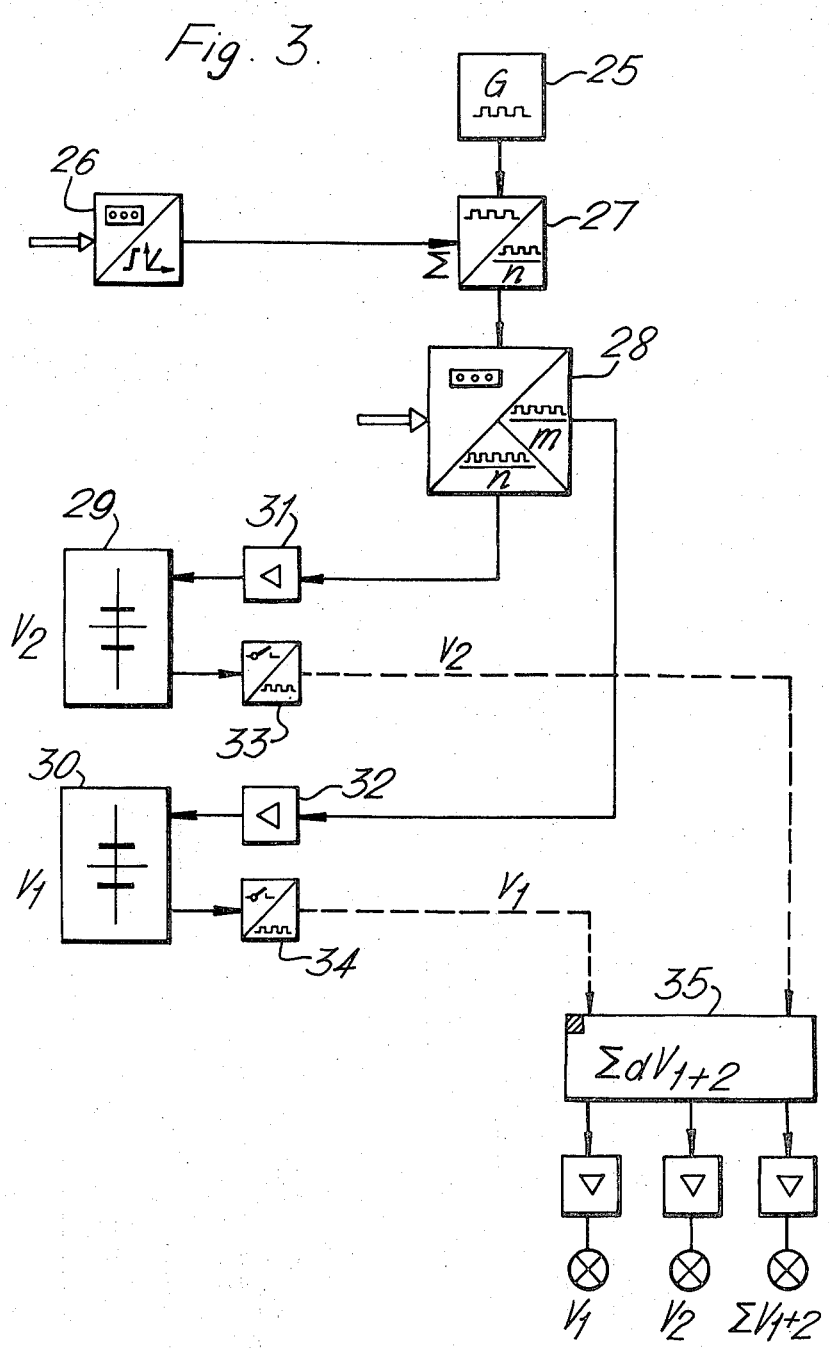
FIG. 3 is a block diagram of a measuring device for petrol pumps.

A measuring device for a petrol pump is described on the basis of FIG. 3. A mechanical or electronic impulse generator 25 produces a constant series of control impulses. The throughflow transmitter 26 which can be adjusted to fit in with the particular requirements determines in the block 27 the number of the impulses to be suppressed between two working periods. The remaining control impulses can be fed directly to a measuring device if one only wishes to determine the throughflow of one medium. In the example shown in the drawing, however, it is presupposed that two media are to be measured in a given ratio to one another, for example two qualities of fuel. In this case the mixture ratio is set in the switch element 28. The number of the effective impulses is divided according to this mixture ratio between the measuring devices 29 and 30. If desired the impulses can be previously amplified in the circuits 31 or 32 and can also be separated according to the different functions which they have within a working cycle.

The number of working cycles or of effective control impulses is fed via the counter 33 or 34 in the form of counting impulses into a computer 35 with indication of volume and price of the individual volumes and their sum.

In connection with the electronic control of the measuring device the drive of the diaphragm and valves shown in FIG. 1 is carried out particularly advantageously by means of lifting magnets 37, 38 and 39.

We claim:

1. A system for controlling the flow of fluids wherein a metering apparatus having a constant volume is intermittently operated and the periods of operation within a given time interval correspond to the volumetric throughput of the system, comprising:
  a metering apparatus having a metering chamber, inlet control means and outlet control means;
  a controller for said metering apparatus including a pulse generator for controlling the flow of fluids through said metering apparatus and means for energizing said pulse generator, said pulse generator when energized supplying a sequence of pulses of constant frequency to activate said metering apparatus, individual pulses within the sequence of pulses being effective to actuate said apparatus and sequentially open the inlet control means to admit fluid into the metering chamber, close the inlet control means valve and discharge the fluid admitted into the metering chamber, and initiate closing of the outlet control means;
  said controlled also including a pulse suppressor for suppressing the flow of pulses from the pulse generator for predetermined intervals of time thereby preventing activation of said apparatus for periods of time equal to the interval of the suppressed pulses.

2. A system for controlling the flow of fluids wherein a displacement pump having a constant stroke volume is intermittently operated and the periods of operation within a given time interval correspond to the volumetric throughput of the system, comprising:
  a diaphragm pump having a metering chamber, a valve controlled inlet and a valve controlled outlet, the diaphragm of said pump capable of operating at a constant amplitude;
  a controller for said pump including a pulse generator for driving said pump and means for energizing said pulse generator, said pulse generator when energized supplying a sequence of pulses of constant frequency to said pump, individual pulses within the sequence of pulses effective to drive said pump and sequentially open the inlet valve to admit fluid into the metering chamber, initiate the suction movement of the diaphragm, close the inlet valve and initiate discharge movement of the diaphragm, and initiate closing of the outlet valve;

said controller also including a pulse suppressor for suppressing the flow of pulses from said pulse generator for predetermined intervals of time thereby preventing activation of the pump for periods of time equal to the interval of the suppressed pulses.

3. A system in accordance with claim 2, in which the movement of the diaphragm is actuated by electromagnet means electrically connected to the controller and responsive to the pulses emitted by the pulse generator and received by the pump.

* * * * *

PO-1050
(5/69)

UNITED STATES PATENT OFFICE
CERTIFICATE OF CORRECTION

Patent No. 3,819,305   Dated June 25, 1974

Inventor(s) Karl Heinz Klochemann and Frank Wurzbacher

It is certified that error appears in the above-identified patent and that said Letters Patent are hereby corrected as shown below:

Column 2, line 20, change "is" to -- in --;

Column 4, line 47, change "controlled" to -- controller --.

Signed and sealed this 24th day of September 1974.

(SEAL)
Attest:

McCOY M. GIBSON JR.
Attesting Officer

C. MARSHALL DANN
Commissioner of Patents